US012794945B2

(12) United States Patent
White et al.

(10) Patent No.: US 12,794,945 B2
(45) Date of Patent: Nov. 10, 2026

(54) INITIATING TRANSMISSION CONTROL PROTOCOL CONNECTIONS TO NON-ROUTABLE REMOTE ENDPOINTS WITHIN A DECENTRALIZED SERVICE MESH

(71) Applicant: Dell Products L.P., Round Rock, TX (US)

(72) Inventors: Alan White, Glasgow (GB); Brian Rochford, Ovens (IE); John McAleer, Waterfall (IE)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 18/672,996

(22) Filed: May 23, 2024

(65) Prior Publication Data

US 2025/0365315 A1 Nov. 27, 2025

(51) Int. Cl.
*H04L 9/40* (2022.01)
*H04L 61/4511* (2022.01)

(52) U.S. Cl.
CPC ........ *H04L 63/166* (2013.01); *H04L 61/4511* (2022.05); *H04L 63/20* (2013.01)

(58) Field of Classification Search
CPC ..... H04L 63/166; H04L 63/20; H04L 61/4511
See application file for complete search history.

(56) References Cited

U.S. PATENT DOCUMENTS

| | | | |
|---|---|---|---|
| 8,387,046 | B1 | 2/2013 | Montague |
| 11,106,800 | B1 | 8/2021 | Markowsky |
| 11,108,828 | B1 | 8/2021 | Curtis et al. |
| 11,469,956 | B2 | 10/2022 | Venkatramani |
| 11,709,720 | B1 | 7/2023 | Fournier |
| 12,170,696 | B2 | 12/2024 | Curtis et al. |
| 12,189,780 | B1 | 1/2025 | Markowsky |

(Continued)

OTHER PUBLICATIONS

Harrenstien et al. "DOD Internet Host Table Specification" RFC 952, [https://datatracker.ietf.org/doc/html/rfc952] Oct. 1985, 6 pages.

(Continued)

*Primary Examiner* — Noura Zoubair
(74) *Attorney, Agent, or Firm* — Amin, Turocy & Watson, LLP

(57) ABSTRACT

A system can maintain, by a connectivity management service, associations between unique identifiers for remote endpoints and connectivity information of the remote endpoints. The system can, based on receiving, by a connectivity abstraction layer and from a microservice, a unique identifier, return, to the microservice, an internet protocol (IP) address that is unique within the system, wherein the IP address fails to identify a publicly-addressable computer, and store an association between the unique identifier and the IP address. The system can, based on receiving, by the connectivity abstraction layer and from the microservice, a request to access a remote endpoint of the remote endpoints that is identified by the IP address, identify the unique identifier from the IP address, determine, from the connectivity management service, connectivity information of the respective connectivity information, based on the unique identifier, and establish a connection with the remote endpoint using the connectivity information.

20 Claims, 10 Drawing Sheets

600

(56) References Cited

U.S. PATENT DOCUMENTS

| | | | | |
|---|---|---|---|---|
| 12,353,551 | B1 | 7/2025 | Lindsey | |
| 12,563,038 | B2 | 2/2026 | White | |
| 12,591,668 | B1 | 3/2026 | Lindsey | |
| 2009/0216875 | A1* | 8/2009 | Shi | H04L 63/0236 709/224 |
| 2013/0031356 | A1* | 1/2013 | Prince | H04L 63/1441 713/168 |
| 2015/0120583 | A1 | 4/2015 | Zarrella | |
| 2016/0315919 | A1* | 10/2016 | Martini | H04L 69/326 |
| 2017/0039211 | A1 | 2/2017 | Pottinger | |
| 2017/0234709 | A1 | 8/2017 | Mackie | |
| 2019/0303541 | A1 | 10/2019 | Reddy et al. | |
| 2020/0286011 | A1 | 9/2020 | Meng | |
| 2021/0058424 | A1 | 2/2021 | Chang | |
| 2021/0374242 | A1 | 12/2021 | Dabak | |
| 2021/0392477 | A1 | 12/2021 | Taft | |
| 2022/0124547 | A1 | 4/2022 | Young | |
| 2023/0236909 | A1 | 7/2023 | Zhang | |
| 2024/0086558 | A1 | 3/2024 | Jadhav | |
| 2025/0175475 | A1 | 5/2025 | Markowsky | |

OTHER PUBLICATIONS

P. Mockapetris. “Domain Names—Concepts and Facilities” RFC 1034, [https://datatracker.ietf.org/doc/html/rfc1034] Nov. 1987, 55 pages.

“DNS Proxying” Istio. [https://istio.io/latest/docs/ops/configuration/traffic-management/dns-proxy/] retrieved Apr. 11, 2025, 9 pages.

“Auto allocate ips based on hashing #42624” istio/istio. [https://github.com/istio/istio/pull/42624/files] retrieved Apr. 11, 2025, 9 pages.

White et al. “Transparent, On-Demand Route Determination and Delegated Authorization in a Large-Scale, Decentralized Service Mesh” U.S. Appl. No. 18/516,628, filed Nov. 21, 2023, 52 pages.

Rochford, et al. “Transparent, On-Demand Route Determination and Delegated Authorization in a Large-Scale, Decentralized Service Mesh” U.S. Appl. No. 18/981,405, filed Dec. 13, 2024, 46 pages.

Rochford, et al. “Protection from Unwanted Behavior in Remote Appliances in a Decentralized Service Mesh” U.S. Appl. No. 19/023,245, filed Jan. 15, 2025, 43 pages.

Office Action mailed Jun. 18, 2025 for U.S. Appl. No. 18/516,628, 25 pages.

“Linux Intrusion Detection System” Wikipedia. [https://en.wikipedia.org/wiki/Linux_Intrusion_Detection_System] retrieved Sep. 18, 2025, 2 pages.

Notice of Allowance mailed Oct. 16, 2025 for U.S. Appl. No. 18/516,628, 44 pages.

Notice of Allowance mailed Apr. 15, 2026 for U.S. Appl. No. 18/981,405, 43 pages.

Office Action mailed May 12, 2026 for U.S. Appl. No. 19/023,245, 70 pages.

* cited by examiner

INITIATING TRANSMISSION CONTROL PROTOCOL CONNECTIONS TO NON-ROUTABLE REMOTE ENDPOINTS WITHIN A DECENTRALIZED SERVICE MESH

BACKGROUND

Computers can communicate via a Transmission Control Protocol (TCP) connection.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a decentralized service mesh. The system can maintain, by a connectivity management service of the system, respective associations between respective unique identifiers for respective remote endpoints and respective connectivity information of the respective remote endpoints, wherein the respective unique identifiers are unique within the system, and wherein the respective unique identifiers follow a hostname format while identifying a hostname that is un-addressable within the decentralized service mesh. The system can, based on receiving, by a connectivity abstraction layer service of the system and from a microservice of the decentralized service mesh, a unique identifier of the unique identifiers, return, to the microservice, an internet protocol address that is unique within the system, wherein the internet protocol address fails to identify a publicly-addressable computer, and store an association between the unique identifier and the internet protocol address. The system can, based on receiving, by the connectivity abstraction layer service and from the microservice, a request to access a remote endpoint of the remote endpoints that is identified by the internet protocol address, identify the unique identifier from the internet protocol address, determine, from the connectivity management service, connectivity information of the respective connectivity information, based on the unique identifier, and establish a connection with the remote endpoint using the connectivity information.

An example method can comprise maintaining, by a system comprising at least one processor, respective associations between respective unique identifiers for respective remote endpoints and respective connectivity information of the respective remote endpoints, wherein the respective unique identifiers follow a hostname format that identify respective hostnames that are un-addressable within a decentralized service mesh. The method can further comprise, based on receiving, by the system and from a microservice of the decentralized service mesh, a unique identifier of the unique identifiers, returning, by the system to the microservice, an internet protocol address that is unique within the system, wherein the internet protocol address does not identify a publicly-addressable computer, and storing, by the system, an association between the unique identifier and the internet protocol address The method can further comprise, based on receiving, by the system and from the microservice, a request to access a remote endpoint of the remote endpoints that is identified by the internet protocol address, identifying, by the system, the unique identifier from the internet protocol address, determining, by the system, connectivity information of the respective connectivity information, based on the unique identifier, and establishing, by the system, a connection with the remote endpoint using the connectivity information.

An example non-transitory computer-readable medium can comprise instructions that, in response to execution, cause a system comprising a processor to perform operations. These operations can comprise, based on receiving, from a microservice of a decentralized service mesh, a unique identifier, returning, to the microservice, an internet protocol address that is unique within the system, wherein the internet protocol address excludes any identification of a publicly-addressable computer, and storing an association between the unique identifier and the internet protocol address. These operations can further comprise, based on receiving, from the microservice, a request to access a remote endpoint that is identified by the internet protocol address, identifying the internet protocol address from the unique identifier, determining connectivity information based on the unique identifier, and establishing a connection with the remote endpoint using the connectivity information.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Example Architectures

Figure 1:
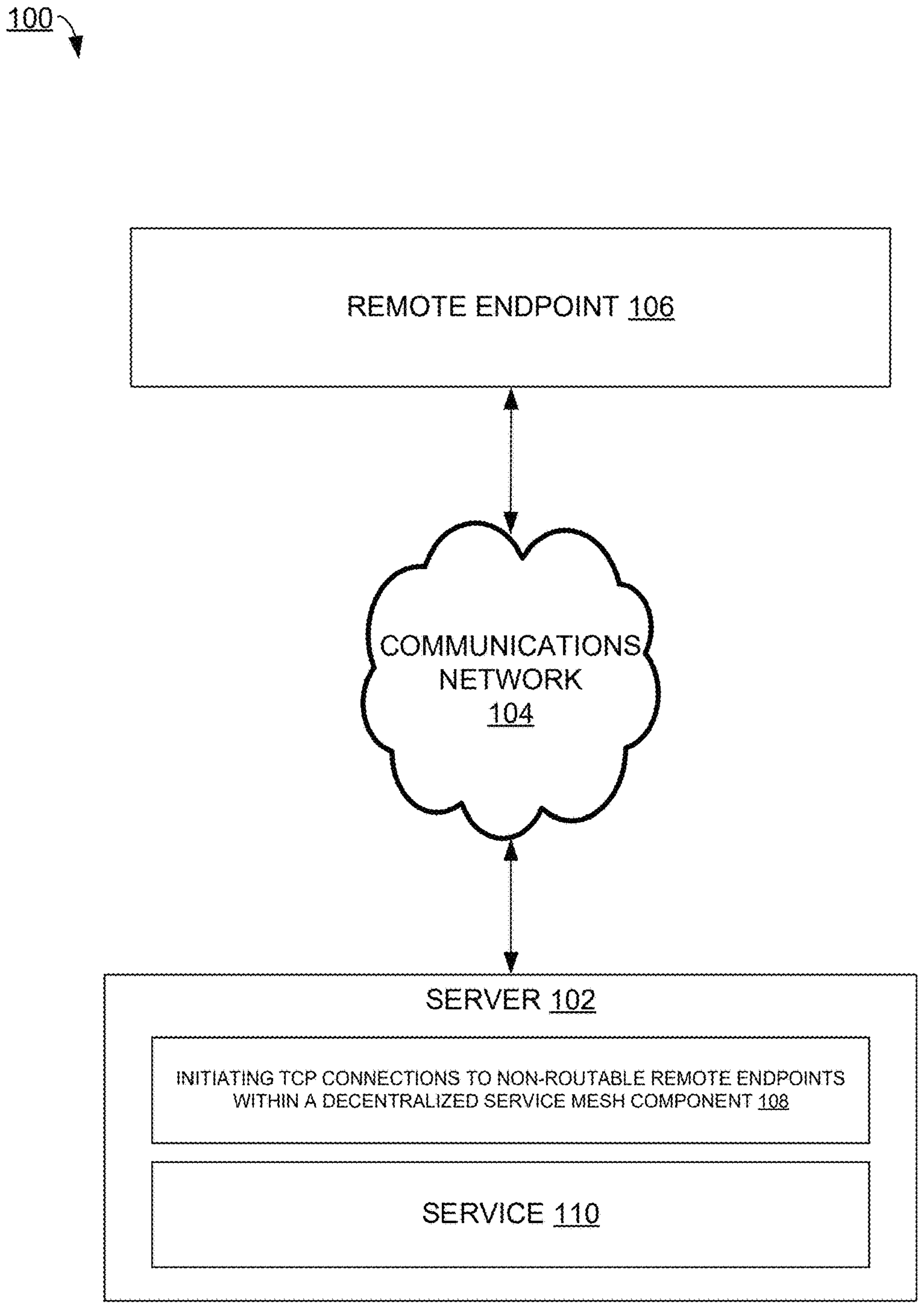
FIG. 1 illustrates an example system architecture that can facilitate initiating TCP connections to non-routable remote endpoints within a decentralized service mesh, in accordance with an embodiment of this disclosure.

FIG. 1 illustrates an example system architecture 100 that can facilitate initiating TCP connections to non-routable remote endpoints within a decentralized service mesh, in accordance with an embodiment of this disclosure.

System architecture 100 comprises server 102, communications network 104, and remote endpoint 106. In turn, server 102 comprises initiating TCP connections to non-routable remote endpoints within a decentralized service mesh component 108, and service 110.

Figure 10:
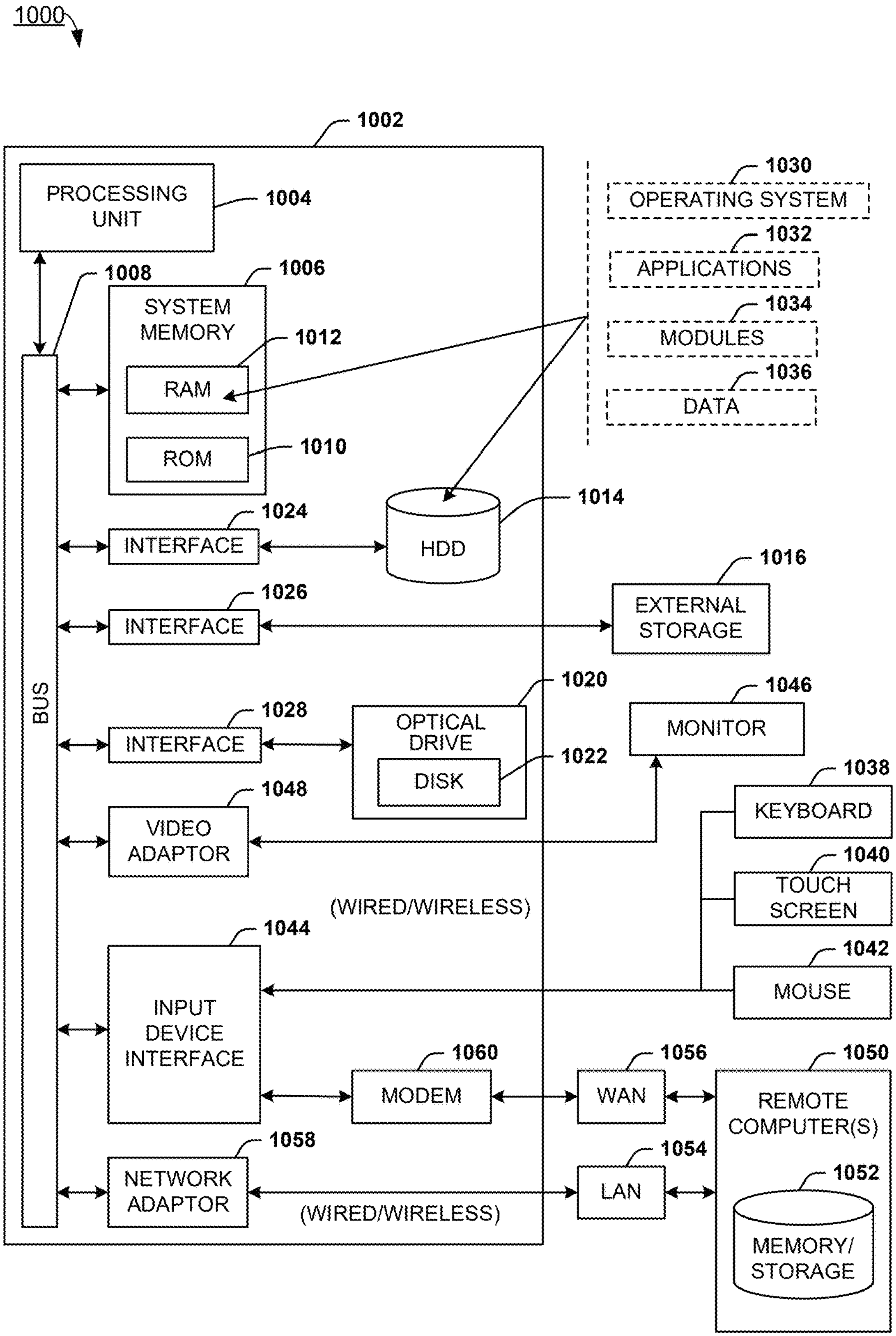
FIG. 10 illustrates an example block diagram of a computer operable to execute an embodiment of this disclosure.

Each of server 102 and/or remote endpoint 106 can be implemented with part(s) of computing environment 1000 of FIG. 10. Communications network 104 can comprise a computer communications network, such as the Internet.

In some examples, service 110 can attempt to establish a connection with remote endpoint 106. Where this is a TCP connection, service 110 will use an Internet Protocol (IP) address to identify remote endpoint. Initiating TCP connections to non-routable remote endpoints within a decentralized service mesh component 108 can maintain an association between connection information for remote endpoint 106 and a hostname for remote endpoint 106. It can be that this hostname does not identify remote endpoint 106 on the public internet, but does identify remote endpoint 106 within server 102.

Initiating TCP connections to non-routable remote endpoints within a decentralized service mesh component 108 can receive the hostname for remote endpoint 106 from service 110, and can respond with an IP address that it generates (where the IP address does not identify remote endpoint 106 on the public internet, but does identify remote endpoint 106 within server 102), and store an association between the hostname and the IP address. Service 110 can use this IP address to create a TCP communication to establish communication with remote endpoint 106.

Initiating TCP connections to non-routable remote endpoints within a decentralized service mesh component 108 can intercept this TCP communication, extract the IP address, identify the associated hostname, and then determine the connection information associated with the hostname. Initiating TCP connections to non-routable remote endpoints within a decentralized service mesh component 108 can establish a connection with remote endpoint 106 using this connection information, and serve as a proxy between service 110 and remote endpoint 106 for communications.

In some examples, initiating TCP connections to non-routable remote endpoints within a decentralized service mesh component 108 can implement part(s) of the process flows of FIGS. 4-9 to facilitate initiating TCP connections to non-routable remote endpoints within a decentralized service mesh.

It can be appreciated that system architecture 100 is one example system architecture for proactive prevention of data unavailability and data loss, and that there can be other system architectures that facilitate initiating TCP connections to non-routable remote endpoints within a decentralized service mesh.

Figure 2:
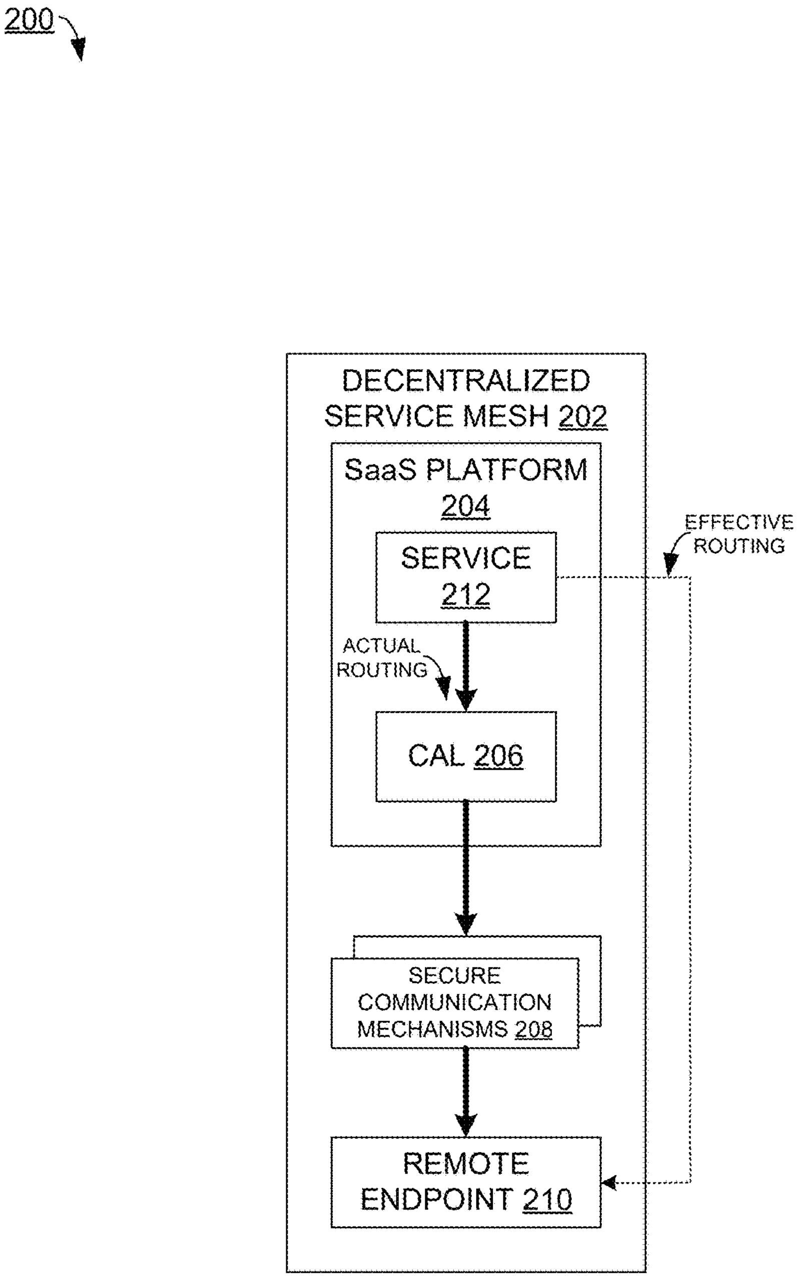
FIG. 2 illustrates another example system architecture that can facilitate initiating TCP connections to non-routable remote endpoints within a decentralized service mesh, in accordance with an embodiment of this disclosure.

FIG. 2 illustrates another example system architecture 200 that can facilitate initiating TCP connections to non-routable remote endpoints within a decentralized service mesh, in accordance with an embodiment of this disclosure. In some examples, part(s) of system architecture 200 can be implemented by system architecture 100 of FIG. 1 to facilitate initiating TCP connections to non-routable remote endpoints within a decentralized service mesh.

System architecture 200 comprises decentralized service mesh 202, software-as-a-service (SaaS) platform 204, connectivity abstraction layer (CAL) 206, secure communication mechanisms 208, remote endpoint 210, and service 212.

Consider a decentralized service mesh running in a cloud computing environment—that is, where the control and management plane functions are distributed across multiple nodes, rather than a centralized control plane. Networking and communication features can be distributed among the participating nodes, enabling autonomy and resilience in the network infrastructure.

This same service mesh can be extended using secure communication methodologies enabling routing to globally distributed appliances or applications, which can be referred to as remote endpoints.

There can be technologies that provide always-on connectivity to a remote endpoint, and on-demand connectivity to a remote endpoint. A communication abstraction layer (CAL) can be implemented to facilitate using multiple secure communication mechanisms.

A CAL can intercept outbound calls from a service and route them to the desired endpoint using an appropriate communication mechanism. This can insulate calling services from the integration details of using these communication mechanisms and allow services to communicate as if they were directly connected to remote endpoints.

However, CAL operating with this model can encounter the following problems:

At the time a service initiates a request to a remote endpoint, it can be that the service does not have a way to resolve the hostname of a remote endpoint to an Internet Protocol (IP) address. A failed Domain Name Service (DNS) lookup can prevent a service from establishing a connection with a remote endpoint. The same can be true if a non-routable IP address is used.

Furthermore, the abstraction layer can operate at the TCP layer, thus allowing it to support TCP-based protocols. A challenge with this approach can be that only the IP address and port are available at this layer. It can be possible that remote endpoints could have the same IP address on their local gateway. A problem to address can then be, how can the connectivity abstraction layer distinguish between remote endpoints with non-unique identifiers?

Figure 3:
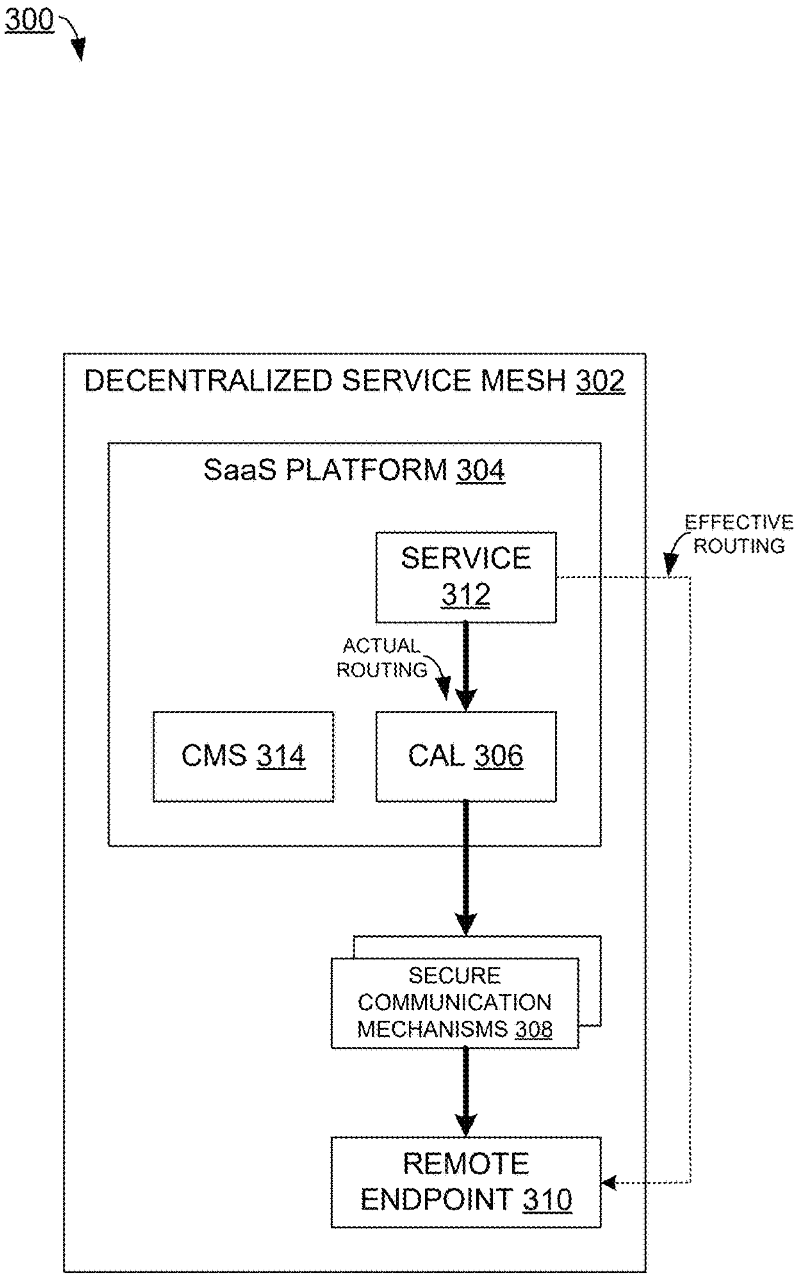
FIG. 3 illustrates another example system architecture that can facilitate initiating TCP connections to non-routable remote endpoints within a decentralized service mesh, in accordance with an embodiment of this disclosure.

FIG. 3 illustrates another example system architecture 300 that can facilitate initiating TCP connections to non-routable remote endpoints within a decentralized service mesh, in accordance with an embodiment of this disclosure. In some examples, part(s) of system architecture 300 can be implemented by system architecture 100 of FIG. 1 to facilitate initiating TCP connections to non-routable remote endpoints within a decentralized service mesh.

System architecture 300 comprises decentralized service mesh 302, software-as-a-service (SaaS) platform 304, connectivity abstraction layer (CAL) 306, secure communication mechanisms 308, remote endpoint 310, and service 312. These parts of system architecture 300 can be similar to decentralized service mesh 202, software-as-a-service (SaaS) platform 204, connectivity abstraction layer (CAL) 206, secure communication mechanisms 208, remote endpoint 210, and service 212 of FIG. 2, respectively. System architecture 300 also comprises connectivity management service (CMS) 314.

Remote endpoint 310 can be referred to as "remote" because it is external to SaaS platform 304. Remote endpoint 310 can still be considered to be part of decentralized service mesh 302 where the decentralized service mesh is extended to remote endpoint 310 via secure communication mechanisms 308.

Some examples can implement both a CAL and a CMS as separate components. It can be that a CAL is invisible to a microservice at a network protocol level. A CAL can be used with a virtual address from a CMS.

It can be that a CMS comprises a persistence layer and can be queried from multiple distinct services. A CAL can be deployable alongside a microservice and populate its cache with requests that are intercepted from that microservice.

The present techniques can be implemented to address these problems with prior approaches, as follows. Consider a connectivity management service that maintains a record of remote endpoints and the connectivity details required to access them. A unique identifier (or key) could be used within this service to identify each remote endpoint.

Where this key is compliant with the requirements for internet hostnames (e.g. Request for Comments (RFC) 952 and RFC 1034), a service can use this as the hostname in its request to indicate the intended remote endpoint target.

These keys can also include a suffix (e.g. example.remote) to distinguish them from genuine, non-remote endpoint hostnames that a service may also want to communicate with.

There can still be a problem where a hostname a service includes in its requests is not resolvable, and that the CAL (operating at the TCP layer) can only read the IP address and port of requests that it intercepts.

Where the CAL intercepts DNS requests (using the same mechanism to intercept outbound requests from the calling service), it can act as a DNS server and respond to requests that have the predetermined suffix (e.g., abc-123.example.remote).

In the DNS response, a unique IP address can be generated by the CAL and returned to the requesting service (e.g., 1.2.3.4). This hostname and IP address pair can then be stored in a local cache (e.g., abc-123.example.remote: 1.2.3.4).

The calling service can then receive the DNS response from the CAL and initiate its outbound connection with the IP address provided.

This outbound connection can also be intercepted by the CAL. Given that it is a TCP connection, the CAL can read the original IP address of the request (e.g., 1.2.3.4). Since the CAL was also the producer of that unique IP address, a lookup in its local cache can return the key representing the intended remote endpoint target (e.g., abd-123.example.remote).

The CAL can then lookup the connectivity details in the connectivity management service, establish the appropriate connection, and relay the network traffic.

Thus, by utilizing a connectivity management service, intercepting outbound DNS queries and using a suffix to identify remote endpoint hosts, the present techniques can facilitate a fully transparent connectivity abstraction layer whereby a service can initiate a TCP connection with a remote endpoint as if the service were directly connected to that remote endpoint.

According to the present techniques, services wishing to communicate over a TCP socket with a remote endpoint can just use the unique identifier of that endpoint as the hostname.

The present techniques can facilitate seamless connectivity over a distributed service mesh capable of using multiple secure connectivity methods. The present techniques can facilitate services that can utilize industry standard TCP based protocols with a remote endpoint that isn't routable at the time the protocol is initiated.

In some prior approaches, non-routable virtual IP addresses (VIPs) can be automatically allocated for TCP requests to external services that do not have stable IPs. However, it can be that such approaches use a portion of a class E subnet (240.240.0.0/16) since the IP address returned from the DNS query must be routable within the service mesh. Thus, these approaches can be limited to ~65 k external service entries. Secondly, it can be that each of these receiving hosts are not part of the service mesh and traffic is forwarded to these hosts at the service mesh boundary.

In contrast, the present techniques can be implemented so as to use any IP address, since the IP address is only in use between a calling service and a connectivity abstraction layer. The upper limit in this case can be over 4 billion IP addresses.

Secondly, the present techniques can facilitate a decentralized service mesh to be extended to remote endpoints using the secure connectivity mechanisms available. Thus, the receiving endpoints can be included in the mesh.

Example Process Flows

Figure 4:
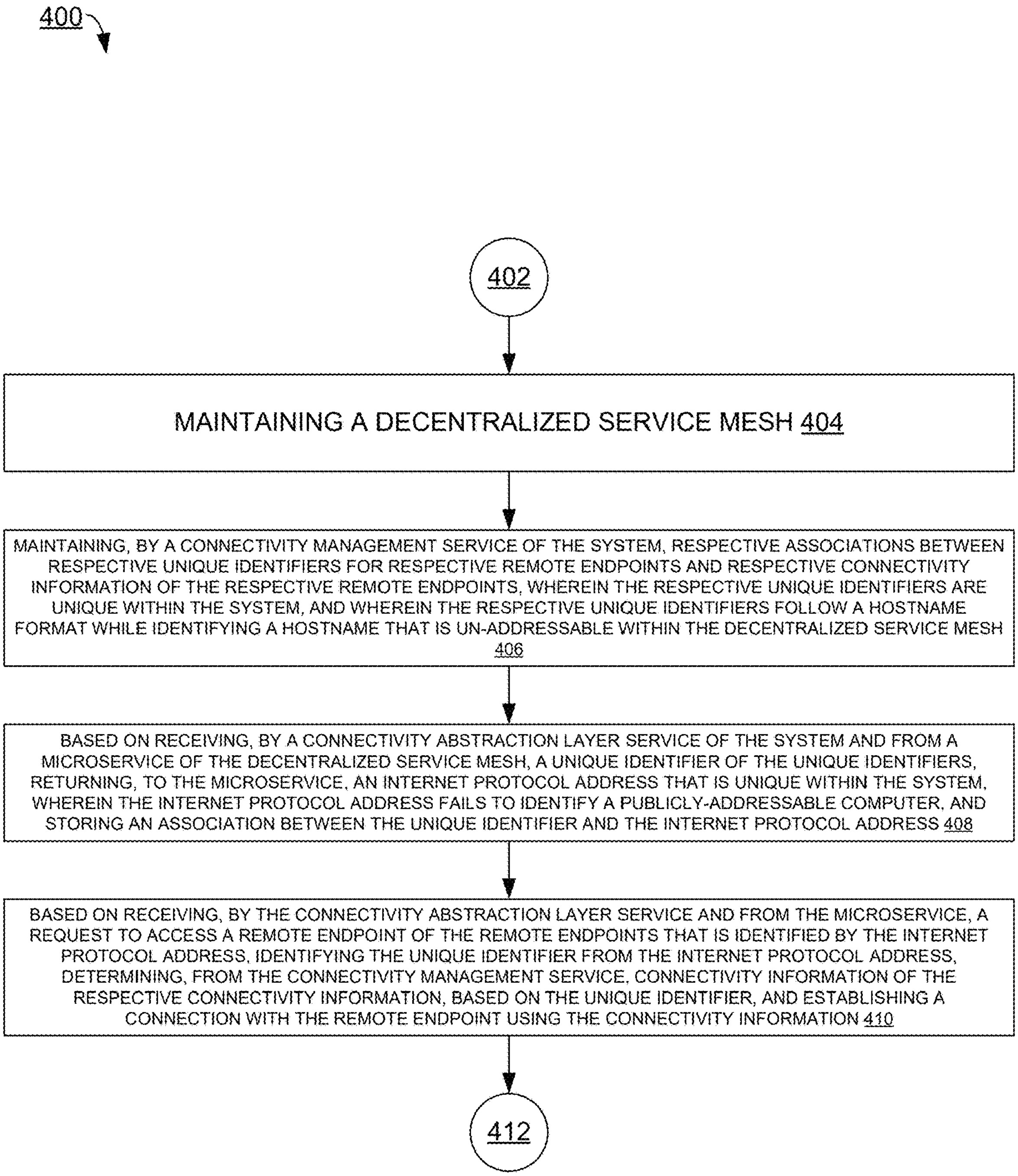
FIG. 4 illustrates an example process flow that can facilitate initiating TCP connections to non-routable remote endpoints within a decentralized service mesh, in accordance with an embodiment of this disclosure.

FIG. 4 illustrates an example process flow 400 for initiating TCP connections to non-routable remote endpoints within a decentralized service mesh, in accordance with an embodiment of this disclosure. In some examples, one or more embodiments of process flow 400 can be implemented by system architecture 100 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, and/or process flow 900 of FIG. 9.

Process flow 400 begins with 402, and moves to operation 404.

Operation 404 depicts maintaining a decentralized service mesh. This can be similar to decentralized service mesh 202 of FIG. 2, and/or decentralized service mesh 302 of FIG. 3.

After operation 404, process flow 400 moves to operation 406.

Operation 406 depicts maintaining, by a connectivity management service of the system, respective associations between respective unique identifiers for respective remote endpoints and respective connectivity information of the respective remote endpoints, wherein the respective unique identifiers are unique within the system, and wherein the respective unique identifiers follow a hostname format while identifying a hostname that is un-addressable within the decentralized service mesh. This connectivity management service can be similar to CMS 314 of FIG. 3. The remote endpoints can be similar to remote endpoint 310. The unique identifiers can have a format similar to abc-123.example.remote (where *.remote is not addressable in the decentralized service mesh without the associations maintained by the CMS). The connectivity information can include information such as an IP address of a remote endpoint, and/or a secure communication mechanism of secure communication mechanisms 308 to use when accessing the remote endpoint.

After operation 406, process flow 400 moves to operation 408.

Operation 408 depicts, based on receiving, by a connectivity abstraction layer service of the system and from a microservice of the decentralized service mesh, a unique identifier of the unique identifiers, returning, to the microservice, an internet protocol address that is unique within the system, wherein the internet protocol address fails to identify a publicly-addressable computer, and storing an association between the unique identifier and the internet protocol address. The connectivity abstraction layer service can be similar to CAL 306 of FIG. 3 and the microservice can be similar to service 110 of FIG. 1. The IP address can identify the remote endpoint to the CAL without being a valid IP address to access the remote endpoint were the CAL not involved.

In some examples, the receiving of the unique identifier comprises receiving a domain name system request. That is, a CAL can intercept DNS requests.

In some examples, the returning of the internet protocol address comprises returning a domain name system response. That is, the CAL can act as a DNS where it intercepts a DNS request.

In some examples, the receiving of the unique identifier comprises intercepting the domain name system request, and wherein the domain name system request is directed to a domain name system service that is separate from the connectivity abstraction layer service. That is, there can be another DNS in addition to the CAL where the CAL performs a DNS function.

Put another way, the CAL can act as a DNS for hostnames with a predetermined suffix (e.g., *.remote). A microservice can send a request that is directed to a DNS, and this request can be intercepted by the CAL. If the predetermined suffix is present in the request from the microservice, the request can be serviced by the CAL. If the predetermined suffix is not present, then the CAL can direct the DNS query to the other DNS.

After operation 408, process flow 400 moves to operation 410.

Operation 410 depicts, based on receiving, by the connectivity abstraction layer service and from the microservice, a request to access a remote endpoint of the remote endpoints that is identified by the internet protocol address, identifying the unique identifier from the internet protocol address, determining, from the connectivity management service, connectivity information of the respective connectivity information, based on the unique identifier, and establishing a connection with the remote endpoint using the connectivity information. The CMS can intercept a request to access an endpoint by the microservice that references the IP address, retrieve the endpoint connectivity from the CAL, and establish the endpoint connection.

In some examples, the request to access the remote endpoint comprises a transmission control protocol communication. In some examples, the transmission control protocol communication is configured to identify the internet protocol address, and omits a configuration to identify hostnames. That is, an outbound connection from a microservice can be a TCP connection, and a CAL can read an IP address of the TCP connection. It can be that TCP connections identify IP addresses and do not identify hostnames.

After operation 410, process flow 400 moves to 412, where process flow 400 ends.

Figure 5:
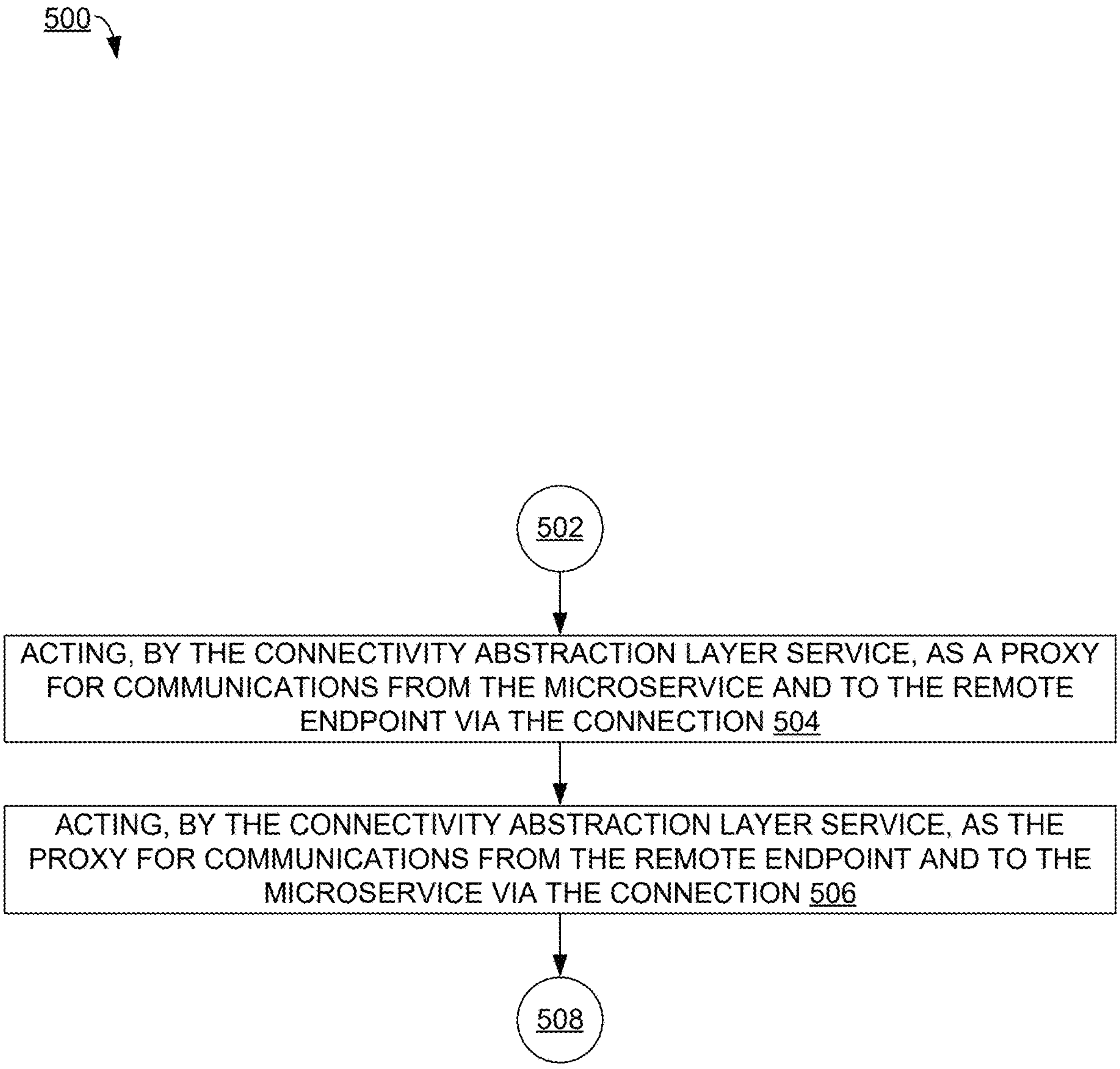
FIG. 5 illustrates another example process flow that can facilitate initiating TCP connections to non-routable remote endpoints within a decentralized service mesh, in accordance with an embodiment of this disclosure.

FIG. 5 illustrates an example process flow 500 for initiating TCP connections to non-routable remote endpoints within a decentralized service mesh, in accordance with an embodiment of this disclosure. In some examples, one or more embodiments of process flow 500 can be implemented by system architecture 100 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, and/or process flow 900 of FIG. 9.

Process flow 500 begins with 502, and moves to operation 504.

Operation 504 depicts acting, by the connectivity abstraction layer service, as a proxy for communications from the microservice and to the remote endpoint via the connection. In some examples where process flow 500 is implemented in conjunction with process flow 400 of FIG. 4, once a connection with a remote endpoint has been established for the microservice, the CAL (e.g., CAL 306 of FIG. 3) can act as a proxy for communications that the microservice sends to the remote endpoint.

After operation 504, process flow 500 moves to operation 506.

Operation 506 depicts acting, by the connectivity abstraction layer service, as the proxy for communications from the remote endpoint and to the microservice via the connection. That is, the CAL can also act as a proxy for communications that the remote endpoint sends to the microservice.

Together, operations 504-506 can comprise acting, by the connectivity abstraction layer service, as a proxy for communications between the microservice and the remote endpoint via the connection.

After operation 506, process flow 500 moves to 508, where process flow 500 ends.

Figure 6:
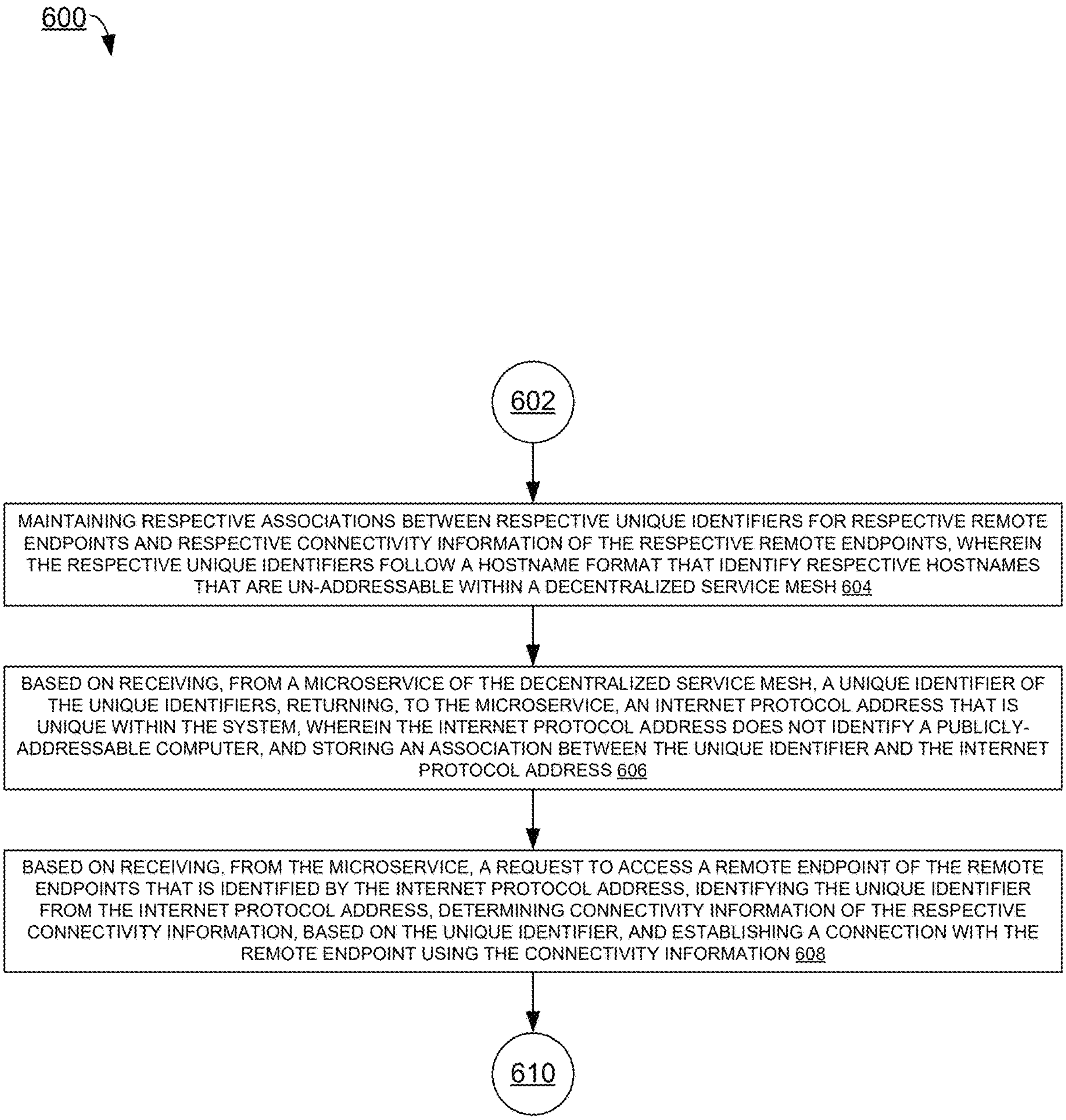
FIG. 6 illustrates another example process flow that can facilitate initiating TCP connections to non-routable remote endpoints within a decentralized service mesh, in accordance with an embodiment of this disclosure.

FIG. 6 illustrates an example process flow 600 for initiating TCP connections to non-routable remote endpoints within a decentralized service mesh, in accordance with an embodiment of this disclosure. In some examples, one or more embodiments of process flow 600 can be implemented by system architecture 100 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, and/or process flow 900 of FIG. 9.

Process flow 600 begins with 602, and moves to operation 604.

Operation 604 depicts maintaining respective associations between respective unique identifiers for respective remote endpoints and respective connectivity information of the respective remote endpoints, wherein the respective unique identifiers follow a hostname format that identify respective hostnames that are un-addressable within a decentralized service mesh. In some examples, operation 604 can be implemented in a similar manner as operation 406 of FIG. 4.

In some examples, respective suffixes of the respective unique identifiers identify that the respective unique identifiers identify respective remote endpoints that comprise the remote endpoint. That is, it can be that a unique identifier that ends in *.remote indicates that the identifier refers to a remote endpoint.

In some examples, the connectivity information identifies a secure communication mechanism from a group of secure communication mechanisms of the system with which to connect to the remote endpoint. Using the example of FIG. 3, the connectivity information can identify which secure communication mechanism of secure communication mechanisms 308 to use when connecting to the remote endpoint.

In some examples, control and management plane functions of the decentralized service mesh as distributed across a group of nodes of the decentralized service mesh. That is, the service mesh can be referred to as decentralized because control and management plane functions are not centralized at one component.

In some examples, a secure connectivity mechanism extends the decentralized service mesh to comprise the remote endpoint. That is, the service mesh can be extended beyond a SaaS platform (e.g., SaaS platform 304 of FIG. 3) to encompass the remote endpoint.

After operation 604, process flow 600 moves to operation 606.

Operation 606 depicts, based on receiving, from a microservice of the decentralized service mesh, a unique identifier of the unique identifiers, returning, to the microservice, an internet protocol address that is unique within the system, wherein the internet protocol address does not identify a publicly-addressable computer, and storing an association between the unique identifier and the internet protocol address. In some examples, operation 606 can be implemented in a similar manner as operation 408 of FIG. 4.

In some examples, operation 606 can comprise selecting the internet protocol address from any valid internet protocol address, and independent of a subnet. That is, using an IP version 4 (IPv4) scheme, any IP address from 0.0.0.1 to 255.255.255.255 could be used. This can be viewed in contrast where only certain subsets of those IP addresses could be used for a similar purpose.

After operation 606, process flow 600 moves to operation 608.

Operation 608 depicts, based on receiving, from the microservice, a request to access a remote endpoint of the remote endpoints that is identified by the internet protocol address, identifying the unique identifier from the internet protocol address, determining connectivity information of the respective connectivity information, based on the unique identifier, and establishing a connection with the remote endpoint using the connectivity information. In some examples, operation 608 can be implemented in a similar manner as operation 410 of FIG. 4.

In some examples, the connection is made via a transmission control protocol socket. That is, a remote endpoint can be accessed via a TCP socket.

After operation 608, process flow 600 moves to 610, where process flow 600 ends.

Figure 7:
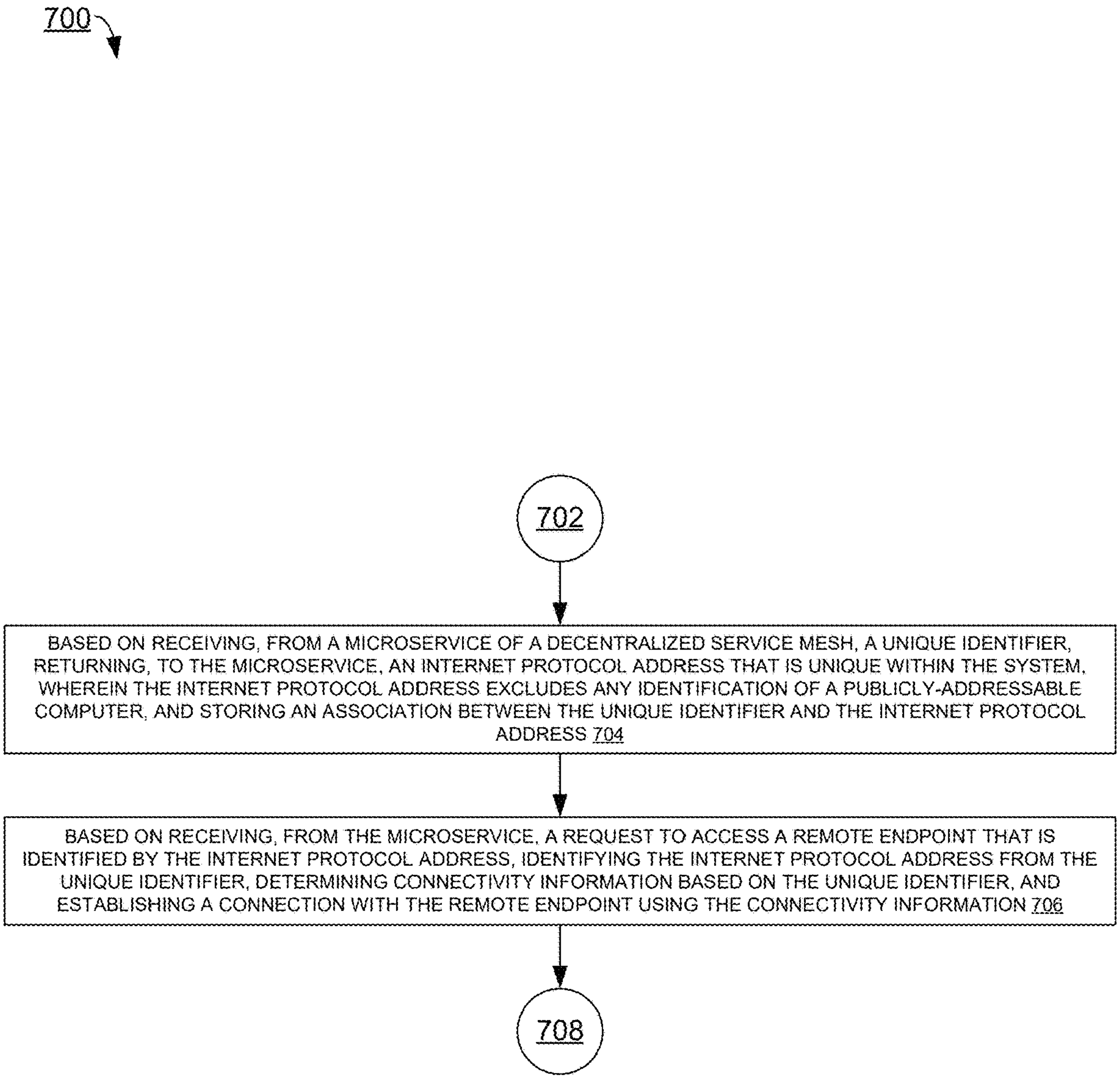
FIG. 7 illustrates another example process flow that can facilitate initiating TCP connections to non-routable remote endpoints within a decentralized service mesh, in accordance with an embodiment of this disclosure.

FIG. 7 illustrates an example process flow 700 for initiating TCP connections to non-routable remote endpoints within a decentralized service mesh, in accordance with an embodiment of this disclosure. In some examples, one or more embodiments of process flow 700 can be implemented by system architecture 100 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, and/or process flow 900 of FIG. 9.

Process flow 700 begins with 702, and moves to operation 704.

Operation 704 depicts, based on receiving, from a microservice of a decentralized service mesh, a unique identifier, returning, to the microservice, an internet protocol address that is unique within the system, wherein the internet protocol address excludes any identification of a publicly-addressable computer, and storing an association between the unique identifier and the internet protocol address. In some examples, operation 704 can be implemented in a similar manner as operation 408 of FIG. 4.

In some examples, the unique identifier is a first unique identifier, a first suffix of the first unique identifier identifies that a first associated endpoint is remote, a second suffix of a second unique identifier identifies that a second associated endpoint is local, and the first suffix differs from the second suffix. Using the example of *.remote hostnames, it can be that all *.remote hostnames that are used identify remote endpoints.

After operation 704, process flow 700 moves to operation 706.

Operation 706 depicts, based on receiving, from the microservice, a request to access a remote endpoint that is identified by the internet protocol address, identifying the internet protocol address from the unique identifier, determining connectivity information based on the unique identifier, and establishing a connection with the remote endpoint using the connectivity information. In some examples, operation 706 can be implemented in a similar manner as operation 410 of FIG. 4.

In some examples, the association between the unique identifier and the internet protocol address is stored in a first data store, and an association between the unique identifier and the connectivity information is stored in a second data store. The first data store can be a CAL (e.g., CAL 306 of FIG. 3), and the second data store can be a CMS (e.g., CMS 314).

In some examples, operation 706 comprises acting as a proxy for communications between the microservice and the remote endpoint via the connection.

After operation 706, process flow 700 moves to 708, where process flow 700 ends.

Figure 8:
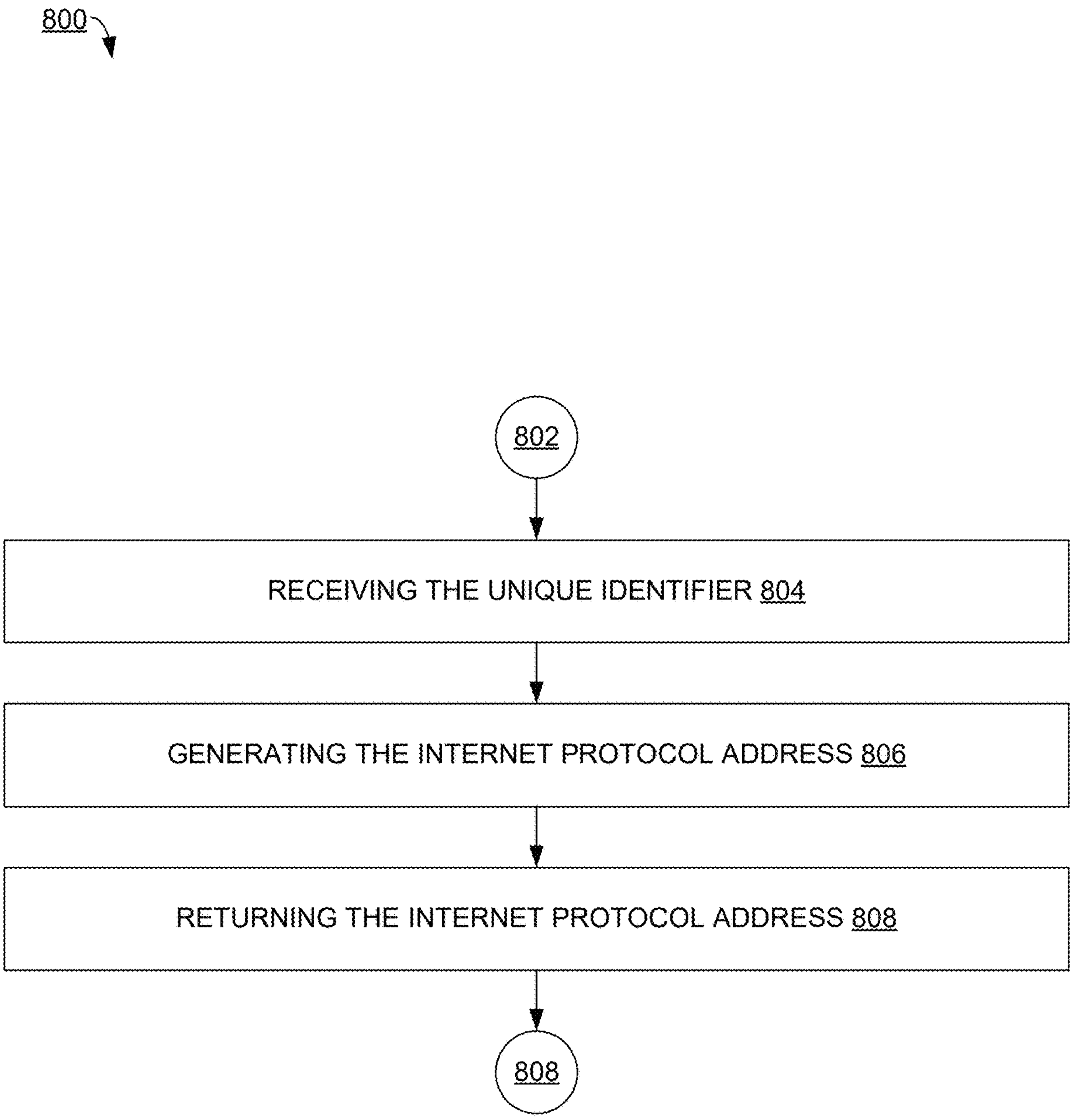
FIG. 8 illustrates another example process flow that can facilitate initiating TCP connections to non-routable remote endpoints within a decentralized service mesh, in accordance with an embodiment of this disclosure.

FIG. 8 illustrates an example process flow 800 for initiating TCP connections to non-routable remote endpoints within a decentralized service mesh, in accordance with an embodiment of this disclosure. In some examples, one or more embodiments of process flow 800 can be implemented by system architecture 100 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, and/or process flow 900 of FIG. 9.

Process flow 800 begins with 802, and moves to operation 804.

Operation 804 depicts receiving the unique identifier. That is, a microservice can supply a unique identifier to a CAL.

After operation 804, process flow 800 moves to operation 806.

Operation 806 depicts generating the internet protocol address. That is, the CAL can generate the IP address for the unique identifier based on the microservice sending it to the CAL, and where the CAL does not already have an IP address for that unique identifier.

After operation 806, process flow 800 moves to operation 808.

Operation 808 depicts returning the internet protocol address. That is, having generated the IP address, the CAL can return the IP address to the microservice, in response to operation 804.

Together, operations 804-808 can comprise, based on the receiving of the unique identifier, generating the internet protocol address before the returning of the internet protocol address.

After operation 808, process flow 800 moves to 810, where process flow 800 ends.

Figure 9:
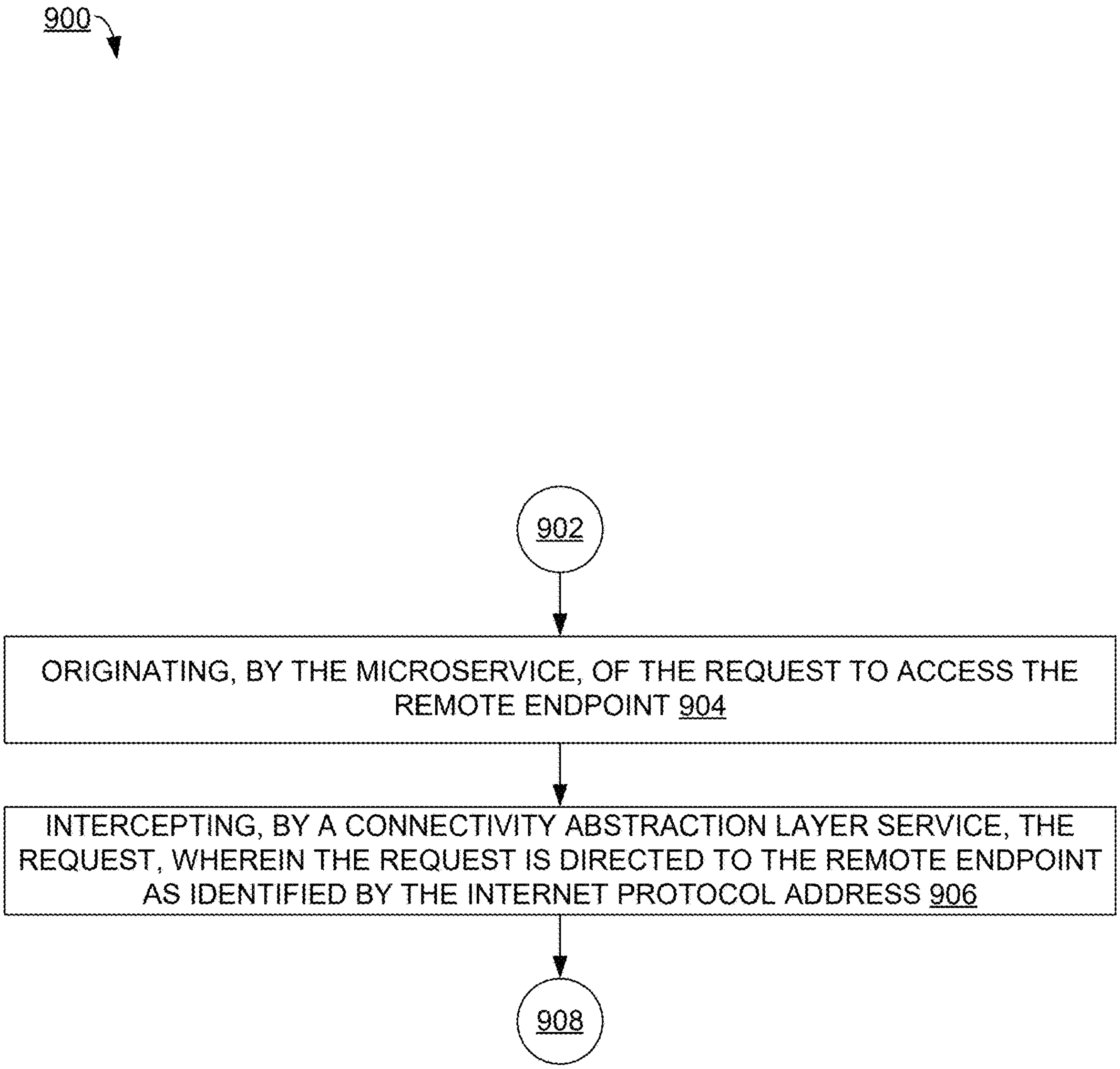
FIG. 9 illustrates another example process flow that can facilitate initiating TCP connections to non-routable remote endpoints within a decentralized service mesh, in accordance with an embodiment of this disclosure.

FIG. 9 illustrates an example process flow 900 for initiating TCP connections to non-routable remote endpoints within a decentralized service mesh, in accordance with an embodiment of this disclosure. In some examples, one or more embodiments of process flow 900 can be implemented by system architecture 100 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, and/or process flow 800 of FIG. 8.

Process flow 900 begins with 902, and moves to operation 904.

Operation 904 depicts originating, by the microservice, of the request to access the remote endpoint. That is, a microservice can attempt to access a remote endpoint.

After operation 904, process flow 900 moves to operation 906.

Operation 906 depicts intercepting, by a connectivity abstraction layer service, the request, wherein the request is directed to the remote endpoint as identified by the internet protocol address. That is, this attempt by the microservice to access the remote endpoint can be intercepted by a CAL, and then processed by the CAL.

After operation 906, process flow 900 moves to 908, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of server 102 and/or remote endpoint 106 of FIG. 1.

In some examples, computing environment 1000 can implement one or more embodiments of the process flows of FIGS. 4-9 to initiating TCP connections to non-routable remote endpoints within a decentralized service mesh.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, arc to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 (containing disk 1022) can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the. NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1016 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

maintaining a decentralized service mesh that distributes control and management plane functions across multiple nodes, and that facilitates execution of microservices within the decentralized service mesh;

maintaining, by a connectivity management service of the system, respective associations between respective unique identifiers for respective remote endpoints and respective connectivity information of the respective remote endpoints, wherein the respective unique identifiers are unique within the system, and wherein the respective unique identifiers follow a domain name system hostname format while identifying a respective hostname that is un-addressable within the decentralized service mesh, and wherein the respective hostnames are of a form that is un-addressable on a public communications network that connects the system and the remote endpoints;

based on receiving, by a connectivity abstraction layer service of the system and from a first microservice of the decentralized service mesh, a first unique identifier of the unique identifiers, wherein a first suffix of the first unique identifier identifies that a first associated endpoint is remote, returning, to the first microservice, an internet protocol address that is unique within the system based on the first suffix identifying that the first associated endpoint is remote, wherein the internet protocol address fails to identify a publicly-addressable computer, and storing an association between the first unique identifier and the internet protocol address;

based on receiving, by the connectivity abstraction layer service and from the first microservice, a request to access a remote endpoint of the remote endpoints that is identified by the internet protocol address, identifying the first unique identifier from the internet protocol address, determining, from the connectivity management service, connectivity information of the respective connectivity information, based on the first unique identifier, and establishing a connection with the remote endpoint using the connectivity information; and based on receiving, from the first microservice or a second microservice, a second request to access including a second unique identifier associated with a second endpoint, wherein a second suffix of the second unique identifier identifies that the second associated endpoint is local, wherein the first suffix differs from the second suffix. determining, by the system, that the second unique identifier identifies that the second associated endpoint is local to the decentralized service mesh based on the second suffix.

2. The system of claim 1, wherein the operations further comprise:

acting, by the connectivity abstraction layer service, as a proxy for communications between the first microservice and the remote endpoint via the connection.

3. The system of claim 1, wherein the receiving of the first unique identifier comprises:

receiving a domain name system request.

4. The system of claim 3, wherein the returning of the internet protocol address comprises returning a domain name system response.

5. The system of claim 3, wherein the receiving of the first unique identifier comprises intercepting the domain name system request, by the connectivity abstraction layer service, and wherein the domain name system request is directed to a domain name system service that is separate from the connectivity abstraction layer service, and wherein the intercepting is performed independently of the domain name system request resolving to an identifier of the connectivity abstraction layer service.

6. The system of claim 1, wherein the request to access the remote endpoint comprises a transmission control protocol communication.

7. The system of claim 6, wherein the transmission control protocol communication is configured to identify the internet protocol address, and omits a configuration to identify hostnames.

8. A method, comprising:

maintaining, by a system comprising at least one processor, respective associations between respective unique identifiers for respective remote endpoints and respective connectivity information of the respective remote endpoints, wherein the respective unique identifiers follow a hostname format that identify respective hostnames that are un-addressable within a decentralized service mesh that distributes control and management plane functions across multiple nodes, and that facilitates execution of microservices within the decentralized service mesh, and wherein the respective hostnames are of a type that is un-addressable on a public communications network that connects the system and the remote endpoints;

based on receiving, by the system and from a first microservice of the decentralized service mesh, a first unique identifier of the unique identifiers, wherein a first suffix of the first unique identifier identifies that a first associated endpoint is remote, returning, by the system to the first microservice, an internet protocol address that is unique within the system based on the first suffix identifying that the first associated endpoint is remote, wherein the internet protocol address does not identify a publicly-addressable computer, and storing, by the system, an association between the first unique identifier and the internet protocol address;

based on receiving, by the system and from the first microservice, a request to access a remote endpoint of the remote endpoints that is identified by the internet protocol address, identifying, by the system, the first unique identifier from the internet protocol address, determining, by the system, connectivity information of the respective connectivity information, based on the first unique identifier, and establishing, by the system, a connection with the remote endpoint using the connectivity information; and based on receiving, from the first microservice or a second microservice, a second request to access including a second unique identifier associated with a second endpoint, wherein a second suffix of the second unique identifier identifies that the second associated endpoint is local, wherein the first suffix differs from the second suffix, determining, by the system, that the second unique identifier identifies that the second associated endpoint is local to the decentralized service mesh based on the second suffix.

9. The method of claim 8, wherein respective suffixes of the respective unique identifiers identify that the respective unique identifiers identify respective remote endpoints that comprise the remote endpoint.

10. The method of claim 8, wherein the connectivity information identifies a secure communication mechanism from a group of secure communication mechanisms of the system with which to connect to the remote endpoint.

11. The method of claim 8, further comprising:

selecting, by the system, the internet protocol address from any valid internet protocol address, and independent of a subnet.

12. The method of claim 8, wherein the connection is made via a transmission control protocol socket.

13. The method of claim 8, wherein control and management plane functions of the decentralized service mesh are distributed across a group of nodes of the decentralized service mesh.

14. The method of claim 8, wherein a secure connectivity mechanism extends the decentralized service mesh to comprise the remote endpoint.

15. A non-transitory computer-readable medium comprising instructions that, in response to execution, cause a system comprising at least one processor to perform operations, comprising:

based on receiving, from a first microservice of a decentralized service mesh that distributes control and management plane functions across multiple nodes and that facilitates execution of microservices within the decentralized service mesh, a first unique identifier, wherein the first unique identifier comprises a domain name that is un-addressable on a public communications network that connects the first microservice and a remote endpoint, and wherein a first suffix of the first unique identifier identifies that a first associated endpoint is remote, returning, to the first microservice, an internet protocol address that is unique within the system based on the first suffix identifying that the first associated endpoint is remote, wherein the internet protocol address excludes any identification of a publicly-addressable computer, and storing an association between the first unique identifier and the internet protocol address;

based on receiving, from the first microservice, a first request to access the remote endpoint that is identified by the internet protocol address, identifying the internet protocol address from the first unique identifier, determining connectivity information based on the first unique identifier, and establishing a connection with the remote endpoint using the connectivity information; and based on receiving, from the first microservice or a second microservice, a second request to access including a second unique identifier associated with a second endpoint,, wherein a second suffix of the second unique identifier identifies that the second associated endpoint is local, wherein the first suffix differs from the second suffix, determining that the second unique identifier identifies that the second associated endpoint is local to the decentralized service mesh based on the second suffix.

16. The non-transitory computer-readable medium of claim 15, wherein the operations further comprise:

based on the receiving of the first unique identifier, generating the internet protocol address before the returning of the internet protocol address.

17. The non-transitory computer-readable medium of claim 15, wherein the association between the first unique identifier and the internet protocol address is stored in a first data store of a connectivity abstraction layer of the decentralized service mesh, and wherein an association between the first unique identifier and the connectivity information is stored in a second data store of a connectivity management layer of the decentralized service mesh.

18. The non-transitory computer-readable medium of claim 15, wherein the receiving of the first request to access the remote endpoint comprises:

intercepting the first request, wherein the first request is directed to the remote endpoint as identified by the internet protocol address.

19. The non-transitory computer-readable medium of claim 15, wherein the operations further comprise:

acting as a proxy for communications between the first microservice and the remote endpoint via the connection.

20. The non-transitory computer-readable medium of claim 15, wherein the receiving of the first unique identifier comprises:

receiving a domain name system request.

* * * * *